July 12, 1960 R. H. CARPENTER 2,944,841
HOSE CLAMP
Filed Sept. 23, 1955
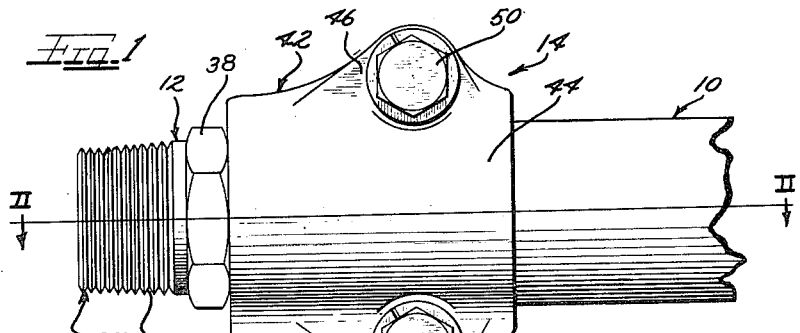
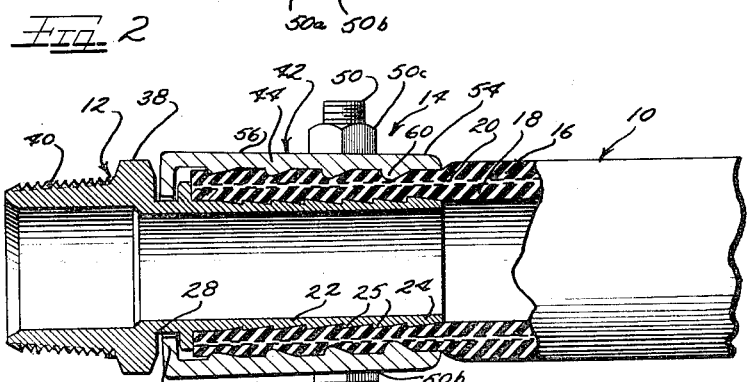
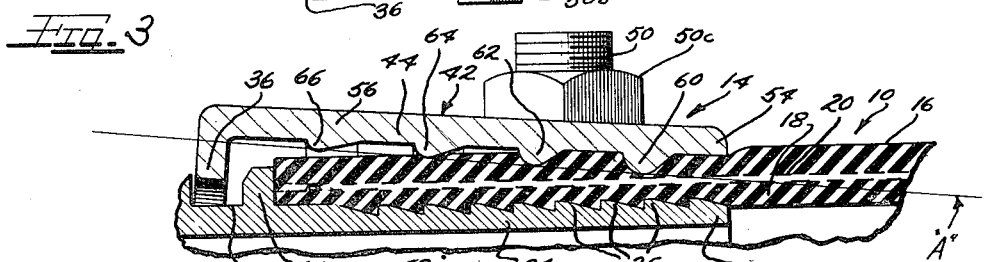
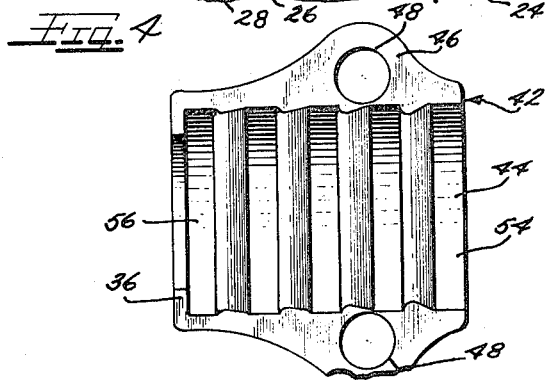
Inventor
ROBERT H. CARPENTER
By Hill, Sherman, Meroni, Gross & Simpson  Attys

United States Patent Office 2,944,841
Patented July 12, 1960

2,944,841

HOSE CLAMP

Robert H. Carpenter, Fort Wayne, Ind., assignor, by mesne assignments, to Flexonics Corporation, Maywood, Ill., a corporation of Illinois Filed Sept. 23, 1955, Ser. No. 536,071

4 Claims. (Cl. 285—243)

This invention relates to hose clamps, and more particularly to hose clamps of the type adapted to clamp a hose over a nipple or projecting stem of an associated fitting.

An object of the present invention is the provision of a new and improved hose clamp, which will be economical to manufacture, and which will be easy to assemble on-the-job, and which will be effective to couple together a hose and a fitting and effectuate a very tight seal between the hose and fitting.

A further object is the provision of a hose clamp which will accomplish the above objects without undue biting or gouging of the hose, as has been found to be occasioned by prior clamping devices, some of which not only bite and tear the exterior surface of the hose but also disturb the adhesion of the cover layer to intervening layer of strengthening mesh or braid.

A further object is the provision of a hose clamp giving a particularly tight grip to the hose adjacent the tip of the stem of the associated fitting.

A still further object is the provision of a hose clamp having as a characteristic that an increase in line pressure which otherwise would tend to cause the hose to be blown off the fitting is made effective to impart a substantially increased gripping force to hold the hose onto the associated fitting.

These and other objects, features, and advantages of the present invention will be readily apparent from the following description of a preferred embodiment thereof, taken in conjunction with the accompanying drawing, in which:

Figure 1 is a top plan view showing a hose fitting and a hose coupled together by a hose clamp according to the present invention;

Figure 2 is a longitudinal sectional view of the assembly shown in Figure 1, and taken generally along the line II—II of Figure 1;

Figure 3 is an enlarged sectional detail of a portion of Figure 2, but showing the parts in an intermediate stage of the application of the clamping effort; and Figure 4 is an elevational view of one of the clamp members shown in the preceding figures, the view showing the inner face of the clamp member which confronts the associated hose.

As shown in the drawing, a hose 10 is coupled to a fitting 12 by a connecting coupling or clamp 14 constructed according to a preferred embodiment of the present invention. The hose 10 shown is of an internally reinforced variety, having an outer elastomeric layer 16 and an elastomeric layer 18 between which is carried a reinforcing layer such as wire braid or mesh 20. The hose 10 is shown as slipped over a nipple 22 having a tip 24 of the associated fitting 12, and onto a longitudinal series of holding teeth or annular barbs 25 provided along the exterior surface of the stem. The hose is desirably pushed along stem 24 to a position in which it bottoms or abuts at its end against a stop shoulder or flange 26 provided near the stem or nipple base on head 27.

Further along the stem 24 and spaced from the flange 26 to provide a groove 28 adapted to receive an inturned retaining flange 36 of the clamp members 14 is a tool-engageable collar such as the hexagonal portion 38. The head end 27 of the fitting 12 is desirably provided with threads 40 for securing the fitting 12 to the apparatus with which the fitting 12 and the hose 10 are to be associated.

The clamp member 14 is adapted by means now to be described to secure the hose 10 tightly onto the stem 24 of the fitting 12. As shown, it comprises two preferably identical, complementary, cooperating gripping members such as the clamp-jaws or plates 42 each having a generally semi-cylindrical intermediate portion 44 adapted to embrace a surface-segment of the end portion of the associated hose 10. Means for drawing the plates 42 together are provided, and in the present embodiment comprise on each a pair of lateral wings or eye flanges 46 each provided with an opening 48 through the respective opposing matching ones of which on the two plates or jaws is adapted to extend a clamp-bolt 50 for clamping together the two clamp-plates 42.

It should be noted that the clamp flanges 46, or at least the openings 48 thereof which receive clamp-bolts 50 and thereby define the location of the application of tightening effort, are off-set from the longitudinal center of the clamp 14, the direction of such off-set being toward the stem tip 22, that is, rightwardly on the drawing. Thus the portion 54 of the clamp plate 42 adjacent the stem tip 22 has much less axial extent and much less area bearing on the hose than does the clamp portion 56 adjacent the head end 27 of the stem 24.

This provides highly desirable operating characteristics. First, it assures that a tight gripping effort will be applied to the hose 10 in the region adjacent the stem tip 22 and thus tends to effectuate a tight seal of the hose 10 to the stem 24 at the very mouth of that stem, thereby restricting or blocking flow of high pressure operating liquid from within the hose 10 past the clamped joint. Moreover, the relative lengths of plate-portions 54—56 assure that any outward movement of plate-portions 54 will be accompanied by a substantially larger inward movement of the other portions 56, as the clamp plate 42 would tend to rock about the bolts 50 as might be caused by pressure in the hose, the holes 48 and bolts 50 being relatively dimensioned to permit this rocking or pivoting movement of the clamp plates 42. Thus, any increase in pressure which would tend to spread or expand the hose-portion embraced by the clamp-plates 42 will tend to rock those plates about the bolts 50 to effectuate a substantially greater gripping of the hose by the outer portions 56 of the clamp plates 42, thus resisting both blow-off of the hose 10 axially of stem 24 and leakage along the stem 24.

Clamping effort is further effected and intensified by an axially-spaced series of transversely extending ridges 60—62—64—66 provided on the interior surface of the arcuate portion 44 of each clamp plate 42. These ridges are adapted to protrude into the layer 16 and compress the same toward the reinforcing layer 20. However, it should be noted that the ridges 60—66 are not sharp, and hence do not bite or gouge into the hose, but rather, penetrate the hose by compressing and displacing the material of the hose. It should be further noted that the ridges 60—66 are desirably of different peak-heights and of different radii of curvature, as is indicated in the drawing by the slope of line "A" in Figure 3, which line is drawn tangent to the peaks of ridges 60—66. The ridge 60, which lies adjacent the stem tip 22 between that tip and the axis of the opening 48 and bolts 50, has the largest peak-height and smallest radius of curvature. The succeeding ridges 62—64—66 are of progressively lesser peak-height, that is the radii of curvature of the peaks of the ridges increases progressively from a minimum diameter possessed by the ridge 60 adjacent the stem tip 22.

A desirable configuration of the ridges 60—66 is as illustrated in the drawing, in which they are shown as possessing a general tear-shape in cross section and affording shoulders directed toward the flange 36 and away from the tip 22.

The importance of the advantages and construction features of the present invention in providing good hose-holding characteristics at high pressures may perhaps be best appreciated by noting its manner of actuation in the application of a hose-clamping effort. The manner of actuation is illustrated to a certain extent in the drawing, Figure 3 showing the parts in an intermediate stage of the application of the clamping effort, and Figure 2 showing the parts in a latter stage of the application of the clamping effort.

In applying the clamp, after the hose 10 has been slipped over the stem 24 to bottom endwise against the stem flange 26, the plates 42 of the clamp 14 are placed on the hose, with the plate-retaining flanges 36 engaging behind the stem shoulder 26 in the stem groove 28 to fix the position of clamp plates 42 axially of the hose 10 and fitting 12. The bolts 50 are then inserted in the aligned openings 48, with lock washers 50a desirably being provided between the bolt heads 50b and flanges 46, and nuts 50c are applied to the threads of the bolts.

During the application of the clamping effort, by alternately tightening each nut 50c onto the associated bolt 50, the following actions take place: Inasmuch as the plate portion 54, which is the relatively short plate portion adjacent the stem tip 22, is shorter and has less area bearing against the hose 10 than the relatively longer plate-portion 56 the compressive force incident to tightening the nuts 50c is concentrated on the section of hose under plate-portion 54 of each plate 42. At the same time, the larger mass of hose under each of plate-portion 56 resists this compression and acts as the fulcrum points of third order levers in which the application of force is at the axis of bolts 50 and the resistance is the hose-portion underlying the plate-portions 54. The initial high compression thereby created in the hose-portions underlying plate-portions 54, particularly assisted by the relatively large-peaked ridge 60 in that area creates a very tight seal of that hose-portion to the tip portion 22 of stem 24. This is of particular advantage. First, it effectuates a tight seal of the hose to the stem 24 at the very mouth of that stem thereby restricting or blocking flow of the operating liquid past the joint, as mentioned above. Additionally, by locking the hose to the tip 22 of the stem 24 during an initial stage of the application of the clamping effort, it assures that any squeezing or displacement of the hose during later compression must be accommodated by a tendency for the hose-portion underlying the clamp plates 42 to be pushed or crowded along the stem 24 in a direction away from the stem tip 22 and toward the shoulder flange 26 thereby improving the hose-gripping characteristics of the clamp and the sealing against leakage.

As tightening continues, and compression under plate-portion 54 is higher than that under plate-portion 56, the levers reverse direction 180°, resulting in higher compression under the plate-portion 56, and any accompanying displacement of the hose is in a direction away from the stem tip 22 and toward the shoulder flange 26 as is desired.

It will thus be seen from the foregoing description of my invention according to a preferred embodiment, considered in conjunction with an accompanying drawing, that the present invention provides a new and improved hose clamp having the desired advantages and characteristics, and accomplishes its intended objects, including those hereinbefore pointed out and others that are inherent in the invention as described.

It will be understood that modifications and variations may be effected without departing from the scope of the novel concepts of the present invention.

I claim as my invention:

1. A hose clamp adapted to clamp a section of hose to a projecting stem of an associated fitting having a stop shoulder spaced substantially from the tip of the stem, the hose being adapted to be slipped over said stem and toward said shoulder, said stem having a generally cylindrical outer contour of fixed outermost radius throughout, comprising, a pair of substantially identical clamp plates, flange means carried by said plates for engaging said stop shoulder to hold said plates and said fitting fixed axially, each of said clamp plates having a generally fixed radius semi-cylindrical inner contour extending from end to end therein adapted to overlie a section of said hose for a length longitudinally therealong opposite the stem and forming opposed clamping surfaces, matching flanges extending from the lateral edges of each of the plates and provided with openings, and bolt means adapted to extend through said openings with limited play and adapted to bear against bearing faces of said flanges for drawing together the two clamp plates in clamping embracement of said hose onto said stem, said openings being inwardly offset from a median plane normal to the longitudinal center of the clamping surfaces of said plates to provide that the portion of said clamping surfaces lying inwardly along the hose with respect to said bolt means has less area for bearing against the hose than has the clamping surfaces outwardly of said bolt means, there being provided along the interior surface of the arcuate portion of each said plate an axially-spaced series of transverse ridges extending inwardly therefrom for protruding into the associated hose to grip the same, said ridges being of progressive peak height from a peak of maximum radial extent adjacent the inner ends of the clamp plates to a peak of minimum radial extent adjacent the outer ends of the clamp plates whereby tightening of the bolt means effects hose clamping engagement by the inner ends of the clamp plates prior to hose clamping engagement by the outer ends of the clamp plates.

2. A hose clamp as claimed in claim 1, wherein the ridges have smooth peaks with the radii of curvature of the peaks of said ridges progressively increasing from a minimum diameter at the inner ends of the clamp plates.

3. A hose clamp as claimed in claim 1, wherein the stop shoulder is in the form of a radial flange at the outer end of the stem and against which the outer end of the hose is adapted to abut.

4. A hose clamp as claimed in claim 3, wherein the ridges are inclined toward said flange whereby movement of the outer ends of the clamp plates toward one another bring the adjacent ridges into more intimate contact with the hose and effect a positive creeping of the outer end of the hose into tighter abutting engagement with said flange.

References Cited in the file of this patent

UNITED STATES PATENTS

| | | |
|---|---|---|
| 237,324 | Reynolds | Feb. 1, 1881 |
| 314,066 | Sergeant | Mar. 17, 1885 |
| 708,117 | Bowers | Sept. 2, 1902 |
| 835,300 | Clark | Nov. 6, 1906 |
| 1,004,634 | Dixon | Oct. 3, 1911 |
| 2,005,613 | Davis | June 18, 1935 |
| 2,280,892 | Cowles | Apr. 28, 1942 |

FOREIGN PATENTS

| | | |
|---|---|---|
| 566,023 | France | Nov. 15, 1923 |
| 599,074 | France | June 7, 1923 |